(12) United States Patent
Roback (10) Patent No.: US 11,685,682 B1
(45) Date of Patent: *Jun. 27, 2023

(54) SYSTEMS AND PROCESSES FOR REMOVING POLLUTANTS FROM WATER, REDUCING GREENHOUSE GAS EMISSIONS, AND REDUCING AQUATIC ECOSYSTEM DESTRUCTION

(71) Applicant: Ian L. Roback, Austin, MN (US)

(72) Inventor: Ian L. Roback, Austin, MN (US)

(*) Notice: Subject to any disclaimer, the term of this patent is extended or adjusted under 35 U.S.C. 154(b) by 1 day.

This patent is subject to a terminal disclaimer.

(21) Appl. No.: 17/449,962

(22) Filed: Oct. 5, 2021

Related U.S. Application Data (63) Continuation-in-part of application No. 16/933,374, filed on Jul. 20, 2020, now Pat. No. 11,173,423.

(Continued)

(51) Int. Cl.
*C02F 3/32* (2023.01)
*B01D 21/02* (2006.01)
(Continued)

(52) U.S. Cl.
CPC ............ *C02F 9/00* (2013.01); *B01D 21/0006* (2013.01); *B01D 21/0012* (2013.01); *B01D 21/0024* (2013.01); *B01D 21/0033* (2013.01); *B01D 21/0045* (2013.01); *B01D 21/0054* (2013.01); *B01D 21/183* (2013.01); *C02F 1/004* (2013.01); *C02F 1/006* (2013.01); *C02F 1/283* (2013.01);
(Continued)

(58) Field of Classification Search
CPC ............ B01D 21/0006; B01D 21/0024; B01D 21/0033; B01D 21/0042; B01D 21/0054; B01D 21/245; B01D 21/2483; C02F 3/046; C02F 3/302; C02F 3/32; C02F 3/327; C02F 2101/163; C02F 2101/166; C02F 2103/007
USPC ......... 210/602, 610, 631, 747.1, 747.5, 803, 210/167.3, 170.01, 170.09, 206, 521, 523, 210/527, 536
See application file for complete search history.

(56) References Cited

U.S. PATENT DOCUMENTS 3,425,913 A 2/1969 Holden
4,157,969 A 6/1979 Thies
(Continued)

FOREIGN PATENT DOCUMENTS

FR 2704769 A1 11/1994

*Primary Examiner* — Christopher Upton
(74) *Attorney, Agent, or Firm* — Andrus Intellectual Property Law, LLP (57) ABSTRACT

Methods and systems for removing pollutants from water include one or more filter systems and a hybrid wetland system. Hybrid wetland systems may include a first pipe transporting water from a body of water to a settling tank, a first constructed wetland connected to the settling tank via a second pipe, and a first filter system removing pollutants from water passing through the second pipe. A second filter system is positioned within the first wetland to further remove pollutants. The system also includes a second constructed wetland connected to the first constructed wetland via a third pipe and a water control chamber. Filtered water exiting the first constructed wetland flows through the water control chamber, through the third pipe, and into the second constructed wetland. A fourth pipe extends between the second constructed wetland and the body of water, returning filtered water to the body of water.

20 Claims, 9 Drawing Sheets

Related U.S. Application Data (60) Provisional application No. 62/982,908, filed on Feb. 28, 2020, provisional application No. 63/092,895, filed on Oct. 16, 2020.

(51) Int. Cl.
| | |
|---|---|
| *C02F 9/00* | (2023.01) |
| *B01D 21/18* | (2006.01) |
| *B01D 21/00* | (2006.01) |
| *C02F 3/04* | (2023.01) |
| *C02F 1/00* | (2023.01) |
| *C02F 101/10* | (2006.01) |
| *C02F 101/16* | (2006.01) |
| *C02F 101/38* | (2006.01) |
| *C02F 103/00* | (2006.01) |
| *C02F 1/28* | (2023.01) |

(52) U.S. Cl.
CPC ............. *C02F 3/046* (2013.01); *C02F 3/327* (2013.01); *C02F 2001/007* (2013.01); *C02F 2101/105* (2013.01); *C02F 2101/163* (2013.01); *C02F 2101/166* (2013.01); *C02F 2101/38* (2013.01); *C02F 2103/001* (2013.01); *C02F 2103/007* (2013.01); *C02F 2201/003* (2013.01); *C02F 2201/005* (2013.01); *C02F 2203/006* (2013.01); *C02F 2301/04* (2013.01); *C02F 2301/08* (2013.01)

(56) References Cited

U.S. PATENT DOCUMENTS

| | | | | |
|---|---|---|---|---|
| 4,810,385 | A | * | 3/1989 | Hater ................. C02F 3/34 210/610 |
| 5,073,261 | A | | 12/1991 | Conradi et al. |
| 5,078,882 | A | * | 1/1992 | Northrop ............. C02F 3/327 210/747.1 |
| 5,171,687 | A | * | 12/1992 | Moller ................ C02F 3/348 210/610 |
| 5,174,897 | A | * | 12/1992 | Wengrzynek ........ C02F 3/327 210/602 |
| 6,607,666 | B2 | | 8/2003 | Rajewski |
| 7,429,319 | B2 | | 9/2008 | Davis |
| 7,740,757 | B2 | | 6/2010 | Yang et al. |
| 10,501,350 | B1 | * | 12/2019 | Burden ................ C02F 3/327 |
| 11,173,423 | B2 | * | 11/2021 | Roback ............. B01D 21/0006 |
| 2002/0121476 | A1 | | 9/2002 | Wang |
| 2007/0045202 | A1 | | 3/2007 | Peloquin et al. |
| 2014/0042064 | A1 | * | 2/2014 | Byeon ................. C02F 3/046 210/170.01 |

\* cited by examiner

SYSTEMS AND PROCESSES FOR REMOVING POLLUTANTS FROM WATER, REDUCING GREENHOUSE GAS EMISSIONS, AND REDUCING AQUATIC ECOSYSTEM DESTRUCTION

CROSS-REFERENCE TO RELATED APPLICATIONS

The present application is a continuation-in-part of U.S. application Ser. No. 16/933,374, filed on Jul. 20, 2020, which claims the benefit of U.S. Provisional Application No. 62/982,908, filed on Feb. 28, 2020, both of which are hereby incorporated herein in their entireties. The present application also claims the benefit of U.S. Provisional Application No. 63/092,895, filed on Oct. 16, 2020, which is hereby incorporated herein in its entirety.

FIELD

The present disclosure relates to a side-flushing mechanical filter system for filtering sediment from fluids.

BACKGROUND

Water treatment systems for filtering sediment from surface water are needed and used worldwide. In all such filter systems, a filter component that traps sediment is needed as well as one or more components that enable the removal of accumulated sediment from the system. Such filter systems generally comprise one of several known configurations. One such configuration is the backflushing (or backwash) filter system, in which water is pumped backwards through the system to dislodge sediment from the filter. Sediment dislodged from the filter in a backflushing filter system then exits the filter system via a designated channel. However, systems using a carbon filter that needs to be backflushed may not be ideal for applications such as agricultural systems, because once water is cleaned it needs to be used. Other known configurations require the system to be opened and the accumulated sediment to be vacuumed from the system, or for the filter (e.g., a mesh) to be removed for cleaning and then replaced in the system. Such known filter systems often require electrical input (e.g., to a pump) to power the system, at least during removal of sediment from the system and in some instances during normal filtration operations. Additionally, or alternatively, such known filter systems may require some degree of disassembly to facilitate sediment removal, and in some such instances may require filter components to be replaced when they become clogged with sediment. The operating requirements of electricity, disassembly for sediment removal, and/or frequent replacement of filter components contribute to the high cost and/or labor intensive nature of such known systems.

Various embodiments of the present invention provide one or more such advantages and address, inter alia, the aforementioned issues with known filter systems.

SUMMARY

In one embodiment, a mechanical filter system comprises a main body comprising an elongated section of pipe extending from a proximal end to a distal end, a first water inlet at the proximal end of the pipe, and a first water outlet at the distal end of the pipe. An elongated spring is positioned within the pipe, the elongated spring comprising a plurality of coils and extending substantially parallel to a longitudinal axis defined by the pipe. A plurality of plates is positioned within the pipe, wherein each plate is attached to a different one of the plurality of coils of the spring such that a major face of each plate is substantially perpendicular to the longitudinal axis of the pipe, each plate of the plurality of plates defining at least one hole therethrough. A rod is positioned partially within the pipe such that a proximal end of the rod is coupled to at least one of the spring and a plate of the plurality of plates, and a distal portion of the rod extends externally of the pipe from the distal end of the pipe. The major face of each plate is configured to arrest sediment from water flowing into the pipe via the first water inlet while the holes defined by the plates enable filtered water to flow therethrough and out of the first water outlet when the first water inlet and the first water outlet are opened.

In one example, a method of using the mechanical filter system includes: pumping water to be filtered from a body of water to a settling tank; allowing large sediment from the water pumped from the body of water to settle; pumping the water from the settling tank into a pipe connecting the settling tank to the filter system; adding biochar or another organic carbon source to the water via the pipe connecting the settling tank to the filter system; allowing the water to pass through the filter system and a hybrid wetland system, thereby removing pollutants from the water; and returning the filtered water to the body of water In one example, a system for removing pollutants from water includes at least one of the mechanical filter system. The system also includes a hybrid wetland system, comprising: a settling tank; a first pipe positioned to transport water to be filtered from a body of water to the settling tank; a first constructed wetland connected to the settling tank via a second pipe, wherein a first filter system is positioned to remove pollutants from water passing through the second pipe before entering the first constructed wetland, and wherein a second filter system is positioned within the first constructed wetland along a path of water flow therethrough to further remove pollutants from the water; a second constructed wetland connected to the first constructed wetland via a third pipe and a water control chamber such that filtered water exiting the first constructed wetland flows through the water control chamber, through the third pipe, and into the second constructed wetland; and a fourth pipe extending between the second constructed wetland and the body of water, positioned to return filtered water to the body of water from the second constructed wetland.

According to another example, an assembly comprises an elongated filter body extending from a first end to an opposite second end and an inlet at the first end of the filter body. An elongated spring is positioned within an interior of the filter body, the elongated spring comprising a plurality of coils and extending substantially parallel to a longitudinal axis extending from the first to second end of the filter body. A plurality of plates is positioned within the filter body, wherein each plate is attached to a different one of the plurality of coils of the spring such that a major face of each plate is substantially perpendicular to the longitudinal axis of the filter body, each plate of the plurality of plates defining at least one hole therethrough. A rod is positioned partially within the filter body such that a first end of the rod is coupled to at least one of the spring and a plate of the plurality of plates, and a second portion of the rod extends externally of the filter body from the second end of the filter body. The major face of each plate is configured to arrest sediment from water flowing into the filter body via the inlet while the holes defined by the plates enable water to flow therethrough toward the second end of the filter body.

The description of the invention and its applications as set forth herein is illustrative and is not intended to limit the scope of the invention. Features of various embodiments may be combined with other embodiments within the contemplation of this invention. Variations and modifications of the embodiments disclosed herein are possible, and practical alternatives to and equivalents of the various elements of the embodiments would be understood to those of ordinary skill in the art. These and other variations and modifications of the embodiments disclosed herein may be made without departing from the scope and spirit of the invention.

DETAILED DESCRIPTION

Side-flushing mechanical filter systems for removing sediment from water are provided. Such systems may generally be referred to herein as "filter systems." Compared to known filter systems, the filter systems of the present disclosure are lower-cost, easier to clean, require less maintenance and avoid the need for a user to frequently replace filters. These and other features make the filter systems of the present disclosure well-suited to agricultural systems, wetland-remediation systems, and other applications in which these advantages are desirable and for which known filter systems are not possible or ideal.

The present disclosure provides a filter system that does not require electricity, disassembly for sediment removal, and/or frequent replacement of filter components, thereby providing a relatively low-cost and low-maintenance filter system that also effectively filters sediment from water and allows accumulated sediment to be easily flushed from the system. Accordingly, in the examples described herein, a side-flushing mechanical filter system for sediment is provided. The side-flushing mechanical filter system of the present disclosure is entirely mechanical and does not require frequent replacement of filter components, while providing effective filtration of sediment. Moreover, the side-flushing mechanical filter system of the present disclosure enables accumulated sediment to be flushed from the system without requiring disassembly of the system. In this manner, the side-flushing mechanical filter system of the present disclosure is relatively low-cost, low-maintenance, and easy to operate. It may be advantageously used in numerous applications, such as developing and/or remote regions where electricity is unavailable and/or where low cost and ease of operation are desirable. While numerous types of sediments may be filtered from water by the side-flushing mechanical filter system described herein, this system notably is capable of effectively filtering nitrates from water. Methods of using the mechanical filter systems and wetland systems described herein advantageously may reduce nutrient pollution through nitrification and denitrification, thereby optimizing bacteria present in the wetland system for carbon capture, nitrous-oxide emission abatement, and nutrient pollution removal, thereby reducing or eliminating the greenhouse gas emissions produced by eutrophication caused by nutrient pollution.

The filter systems of the present disclosure advantageously may be used in wetlands to separate sediment before returning to the water to graywater in the wetland. If used in a hybrid/tiered wetland system (or any system where the water is returned to graywater after filtering), the filter systems of the present disclosure can be used multiple times on each tier or between wetlands to remove sediment and reduce buildup. The filter systems of the present disclosure also may be used in a hybrid wetland comprising a subsurface-flow wetland and a free-flow surface wetland, with the filter system being placed between the two wetlands of the hybrid wetland. Such hybrid wetlands would greatly benefit from having a filter system of the present disclosure between the two wetlands to reduce buildup in the free-flow surface wetland of sediment that can drain from the subsurface-flow wetland. Additionally or alternatively, the filter systems of the present disclosure can be used to filter water for use as drinking water or in reclaimed water irrigation systems and other uses.

The filter systems of the present disclosure comprise a column in a pipe (e.g., PVC pipe) with a plurality of stainless steel plates attached to a spring. The spring extends substantially parallel to the longitudinal axis of the pipe and rests on the inner bottom surface of the pipe. The plates may be attached to coils of the spring in any suitable manner, such as by welding, such that a major face of each plate is substantially perpendicular to the longitudinal axis of the pipe when the spring is positioned in the pipe. The plates are attached to the different coils of the spring such that there is at least one non-plate-bearing coil between each of the plate-bearing coils of the spring to preserve compression and expansion capability of the spring. The plates have holes (made, for example, by drilling) therein to allow water to pass through, but minimal sediment to pass through. Instead, sediment passing through the pipe is arrested by the plates, whereupon much of the sediment falls to the bottom of the pipe beneath the plates. Some of the sediment may adhere to the plates and may be removed therefrom during sediment flushing as described below. A rod (e.g., made of stainless steel) is attached to the distal-most plate in any suitable manner (e.g., by welding) such that a proximal portion of the rod is housed within the pipe. The rod extends distally through a cap (e.g., made of PVC) at the distal end of the pipe, such that a distal section of the rod is external to the pipe, and can be moved longitudinally back-and-forth to move the spring and plates during sediment flushing as described below. The mechanism comprising the plates, spring, and rod operates within the pipe, with the rod exiting the distal end of the system.

It should be understood that although one or more features of the side-flushing mechanical filter systems of the present disclosure are described as being made of a particular material for the sake of example and clarity, any other suitable materials may be used for such components. In addition, one or more features of the filter systems described herein may vary from those illustrated and discussed herein, including but not limited to their dimensions and/or proportions relative to other features, while remaining within the scope of this disclosure.

Figure 1:
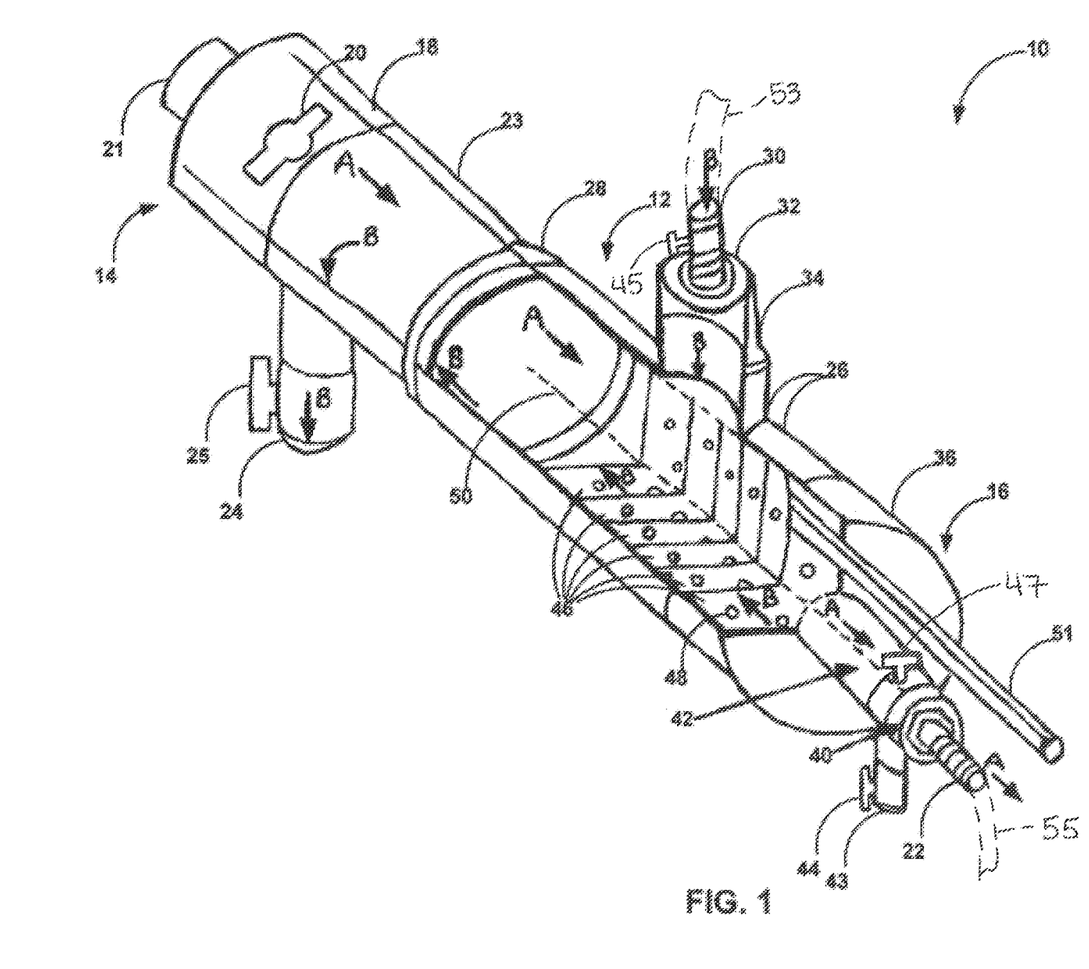
FIG. 1 is a perspective view with partial cutaway of an example side-flushing mechanical filter system in accordance with this disclosure, with paths of water travel during normal operation (A) and during sediment flushing (B) shown.

FIG. 1 is a perspective view with partial cutaway of an example filter system 10 in accordance with this disclosure, with paths of water travel during normal operation (A) and during sediment flushing (B) shown. System 10 includes a main body comprising an elongated section of multi-segmented pipe 12 that extends from a proximal end 14 to a distal end 16. At the proximal end 14 of the pipe 12 is a proximal cap 18 that includes a first valve 20, which may be a 25 cm valve, and a first water inlet 21. A first water outlet 22 is positioned at distal end 16 and discussed in further detail below. In the illustrated embodiment of FIG. 1, proximal cap 18 is a 40 centimeter (cm) PVC cap. Proximal cap 18 is connected to proximal tee socket 23, which may be a 25×25×25 cm PVC tee socket. Proximal tee socket 23 includes second water outlet 24 and a second valve 25, which may be a 25 cm valve. Proximal tee socket 23 is connected to a distal tee socket 26 by proximal 25-to-40 cm PVC connector 28. Distal tee socket 26 may be a 40×40×40 cm tee socket. A second water inlet 30, which may comprise a brass male-to-male connector, is connected to an upper surface of the distal tee socket 26 by a 25 cm female-threaded adaptor 32 and a distal 25-to-40 cm PVC connector 34. Thus, the second water inlet 30 is positioned distally to the second water outlet 24 in the illustrated embodiment of FIG. 1. The distal tee socket 26 is connected to a distal 40 cm PVC cap 36 positioned at distal end 16 of the pipe 12. Extending from the distal cap 36 is the first water outlet 22, which may comprise a brass male-to-male connector connected to the distal cap 36 by a 15 cm female-threaded adaptor 40 and a 15×15×15 cm PVC tee socket 42. The 15×15×15 cm PVC tee socket 42 comprises a sediment outlet 43 positioned at a lower surface of the PVC tee socket 42 and a third valve 44. In some embodiments, a fourth valve 45 may be positioned at the second water inlet 30 and a fifth valve 47 may be positioned at an upper surface of the PVC tee socket 42 to further control the flow of water through the pipe 12 as discussed below.

Within the distal tee socket 26 and the distal cap 36 is positioned a plurality of plates 46 attached to a spring (shown in FIGS. 2-5). The plates 46 and spring may extend from the proximal end of the proximal tee socket 23 to the distal end of the distal tee socket 26. For the sake of illustration of the inside of the pipe 12, however, FIG. 1 only shows the plates 46 extending through the distal tee socket 26. The plates 46, which may be made of stainless steel or other suitable material, each define a plurality of holes 48 that enable the flow of water therethrough. The plates 46 may define any suitable number of holes 48 in any configuration. Although the holes 48 shown in FIG. 1 are substantially circular in shape, it should be understood that the holes 48 may have any suitable shape to enable the flow of water through the pipe 12. The plates 46, which may be circular in shape, are positioned within the pipe 12 such that the major faces of the plates 46 are substantially perpendicular to a longitudinal axis 50 of the pipe 12 and may have a diameter that is nearly equal to an inner diameter of the pipe 12, but less than the inner diameter of the pipe 12 to a degree necessary for the spring and plates 46 to be longitudinally movable within the pipe 12. In this manner, nearly all of the water flowing through the pipe 12 during filtering operation is forced to flow past the plates 46 via the holes 48, enabling the plates 46 to arrest sediment from the water. A rod 51 (e.g., a stainless steel rod) is positioned partially within the pipe 12 such that a proximal end of the rod 51 is attached to a distal-most plate one of plates 46 and a distal portion of rod 51 extends externally of the pipe 12 from the distal cap 36. A rubber water seal may be positioned around the rod 51 where it exits the distal cap 36 to prevent water from escaping around the rod 51.

The operation of the filter system 10 will now be described. During normal filtration operation, the first valve 20 is open, the second valve 25 is closed, and the third valve 44 is closed. If the system is equipped with a fourth valve 45 at the second water inlet 30 and/or a fifth valve 47 at the first water outlet 22, the fourth valve 45 is closed and the fifth valve 47 is open during normal filtration. During normal filtration, water to be filtered takes the path of travel "A", entering the filter system 10 at the first water inlet 21, running through the pipe 12 via the holes 48 defined by the plates 46. Sediment passing through the pipe 12 is arrested by the plates 46, whereupon much of the sediment falls to the bottom of the pipe 12 beneath the plates 46. Some of the sediment may adhere to the plates 46 and may be removed therefrom during sediment flushing as described below. Filtered water exits the pipe 12 via the first water outlet 22, which as described above may be a brass male-to-male connector. A hose may be connected to the brass male-to-male connector at the distal end of the system to direct the cleaned water as desired. If the filter system 10 is equipped with a fifth valve 47 at upper surface of the PVC tee socket 42, the fifth valve 47 may be used to enable further control of the flow of water through the pipe 12, such as during the sediment-flushing operation described below.

When it is desired to clean the sediment from the plates 46, graywater may be introduced into the filter system 10 via a hose 53 connected to the brass male-to-male connector of the second water inlet 30. During sediment flushing, the first valve 20 is closed, the second valve 25 is open, and the third valve 44 is open. If the system is equipped with a fourth valve 45 at the second water inlet 30 and/or a fifth valve 47 at the first water outlet 22, the fourth valve 45 is open and the fifth valve 47 is closed during sediment flushing. If the system 10 is equipped with a fourth valve 45 at the second water inlet 30, the fourth valve 45 may be used to further control the graywater introduced into the system 10. The path of travel "B" shows where the graywater comes in through the second water inlet 30, spraying down onto the plates 46. A user moves the stainless steel rod 51 longitudinally back and forth, causing the plates 46 and the spring to which the plates 46 are attached to move longitudinally through the pipe 12. The plates 46 oscillate while remaining relatively upright when sprayed with the water entering from the second water inlet 30, but will change angles as they are moved longitudinally while the spring is compressed and released by the stainless steel rod 51. During this cleaning operation, the plates 46 push sediment that has gathered in the pipe 12 to the sediment outlet 43, where the sediment is washed out, while the graywater exits the second water outlet 24 at the bottom of the pipe 12. In addition, the graywater that enters from the second water inlet 30 dislodges sediment that may have adhered to the plates 46 during filtering operation, washing the dislodged sediment to the bottom of the pipe 12 where it can be pushed to the sediment outlet 43 during longitudinal movement of the rod 51. The sediment that flows out of the sediment outlet 43 can be captured and used for fertilizer or disposed of.

During cleaning, a hose 55 attached to the male-to-male connector at the first water outlet 22 may be pinched off to prevent water from flowing out of the end of the pipe 12, or, if so equipped, a fifth valve 47 at the PVC tee socket 42 is turned off to prevent water from flowing out of the first water outlet 22 during cleaning. When the second valve 25 is closed, the graywater source is disconnected, and the first water inlet 21 and the first water outlet 22 are opened, water will flow through the pipe 12 normally and sediment will be filtered out by the plates 46.

Thus, no electricity is required for normal operations or cleaning operations of the filter system 10, and cleaning operations do not require disassembly of the filter system 10 or frequent replacement of parts. Instead, as discussed above, the user need only actuate several valves (and/or pinch off and/or connect one or more hoses) and move the rod 51 back and forth to clean accumulated sediment from the filter system 10.

Figure 2:
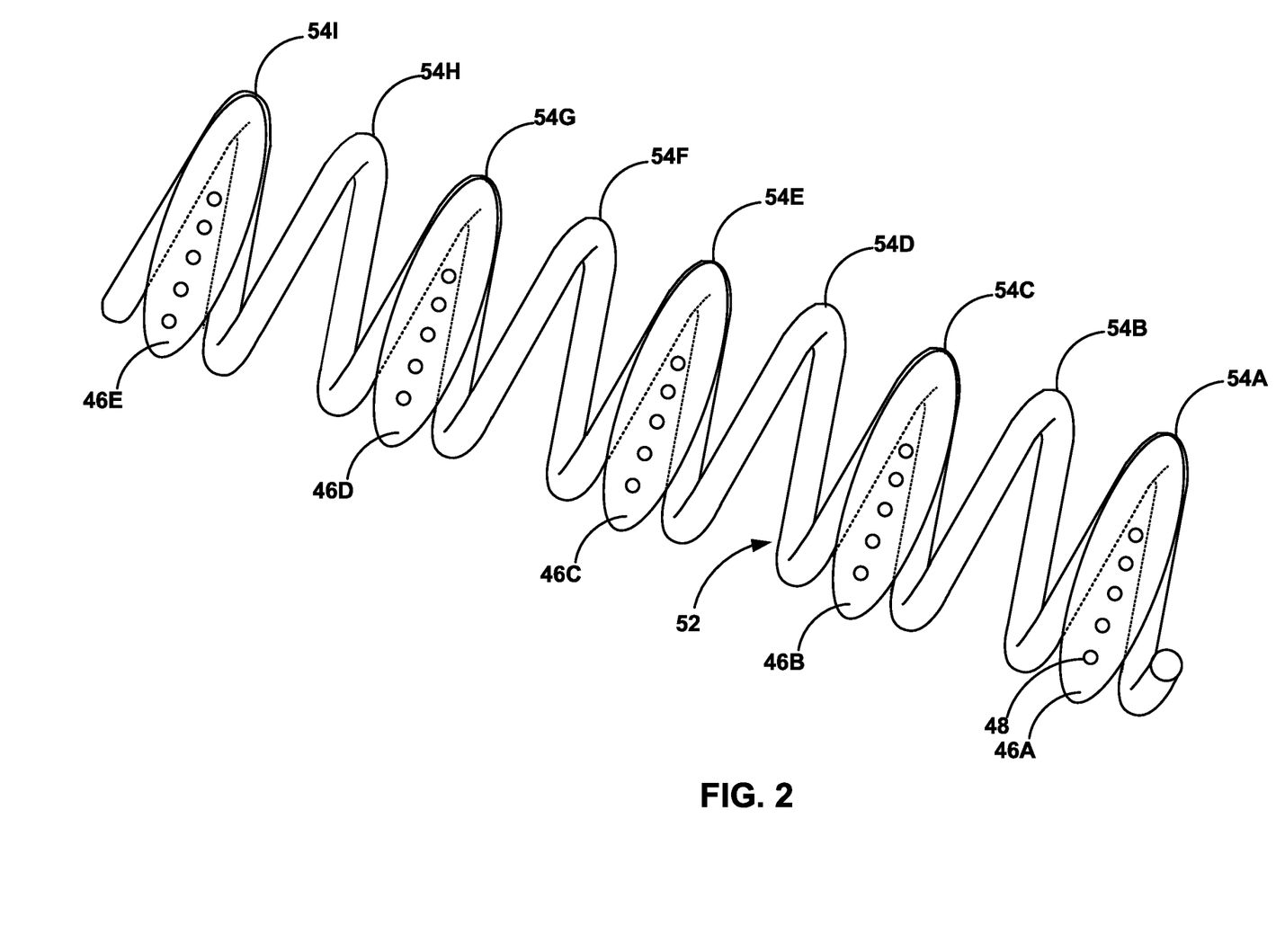
FIG. 2 is a side perspective view of the spring and attached plates of the side-flushing mechanical filter system of FIG. 1.

FIG. 2 is a side perspective view of a spring 52 and attached plates 46A-46E of the side-flushing mechanical filter system 10 of FIG. 1. The spring 52 comprises a plurality of coils 54A-54I. It should be noted that the spring 52 may comprise greater or fewer coils 54 and plates 46 than those shown in FIG. 2 as the numbers of coils and plates shown in FIG. 2 are selected only for the sake of illustration. As shown in FIG. 2, the plates 46A-46E are attached to alternating ones of the coils 54A-54I such that every other one of the coils has a plate attached thereto. Leaving at least one (or more) non-plate bearing coils between plate-bearing coils of the spring 52 prevents the plates 46 from touching and closing off the flow of water. In the embodiment of FIG. 2, major faces of the plates 46A-46E are attached, e.g., by welding, to top edges of the corresponding coils. In this embodiment, the plates 46A-46E and the coils 54A-54I have substantially similar diameters, which may be advantageous in applications where a large amount of sediment buildup is not expected. However, in other embodiments, such as embodiments where more sediment buildup is expected, the coils of the spring may have a diameter substantially smaller than the diameter of the plates, which will help the user maintain control during the sediment flushing process by focusing the force transmitted from the rod on a smaller surface area.

Figure 3:
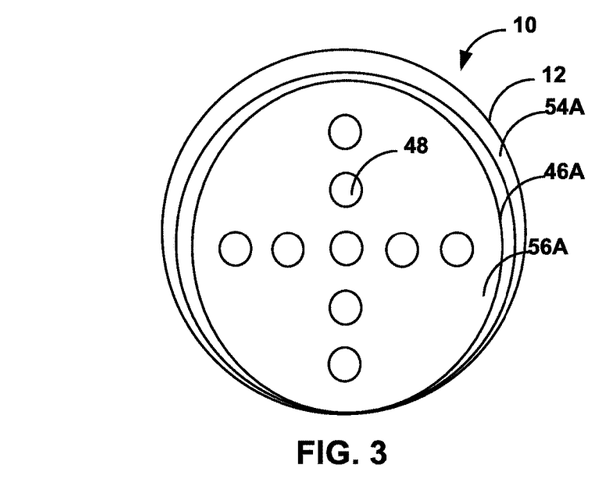
FIG. 3 is a cross-sectional end view of the side-flushing mechanical filter system of FIG. 1, with the cross-section taken perpendicular to the longitudinal axis of the pipe of the filter system at the distal end of the pipe.

FIG. 3 is a cross-sectional end view of the side-flushing mechanical filter system 10 of FIG. 1, with the cross-section taken perpendicular to the longitudinal axis of the pipe 12 of the filter system 10 at the distal end 16 of the pipe 12. As shown in FIG. 3, the distal-most plate 46A is in the foreground, attached to the coil 54A. The plate 46A is positioned within the pipe 12 such that a major face 56A of the plate 46A is substantially perpendicular to the longitudinal axis of the pipe 12. Together, the spring 52 and the plate 46A occupy nearly the entire inner diameter of the pipe 12 so that nearly all of the water flowing through the pipe 12 and past the plate 46A during normal filtration will pass through the holes 48.

Figure 4:
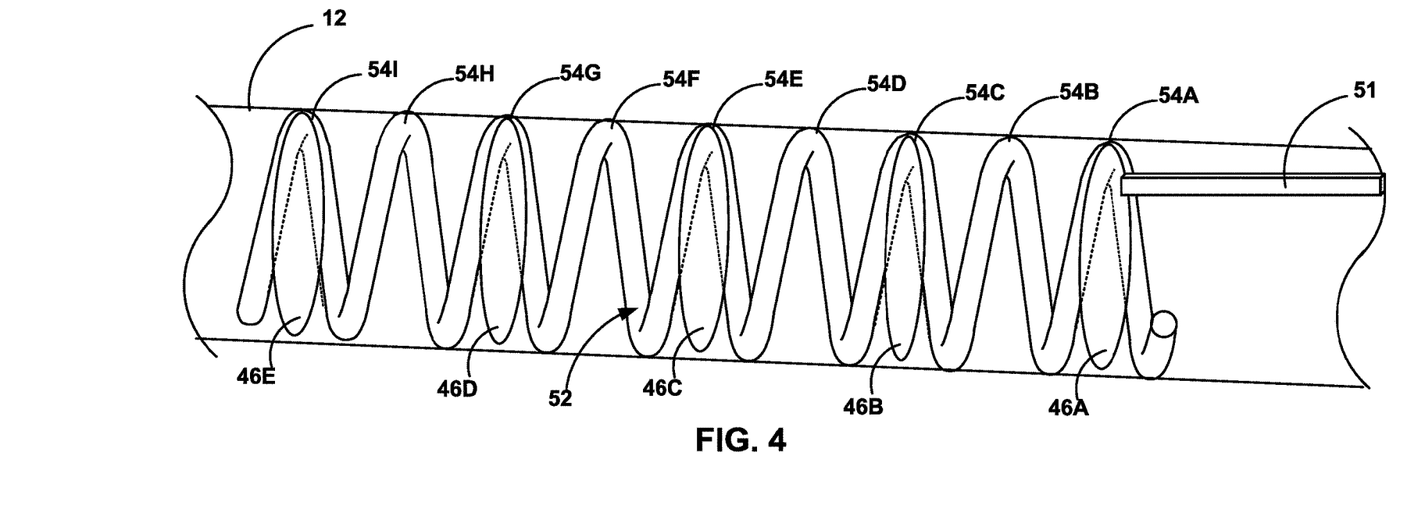
FIG. 4 is another side perspective view of the spring and attached plates of the side-flushing mechanical filter system of FIG. 1, with the spring and plates positioned within the pipe and the rod attached to the distal-most plate.

FIG. 4 is another side perspective view of the spring 52 and attached plates 46A-46E of the side-flushing mechanical filter system 10 of FIG. 1, with the spring 52 and plates 46A-46E positioned within the pipe 12 and the rod 51 attached to the distal-most plate 46A.

Figure 5:
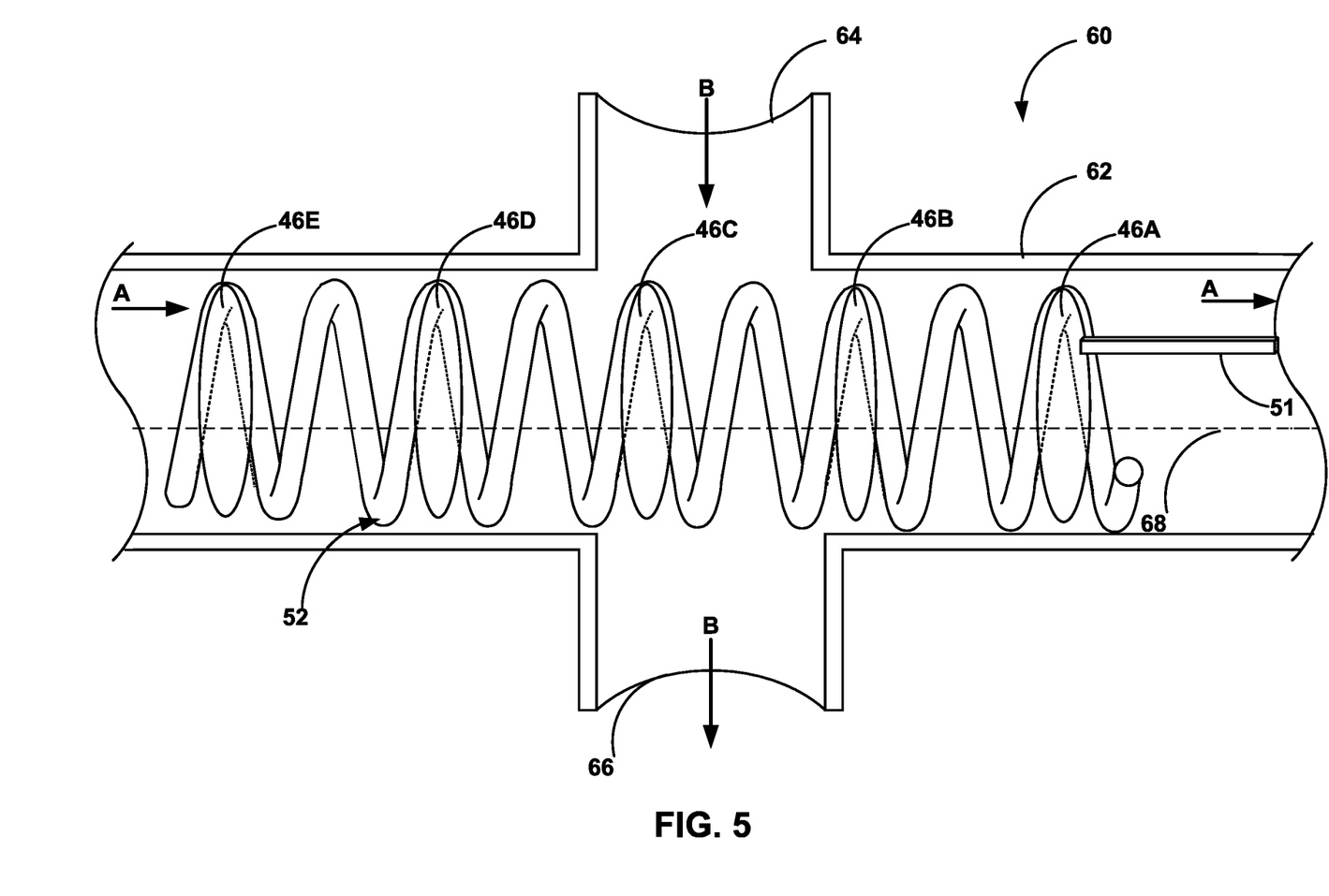
FIG. 5 is a cross-sectional side view of another example of a side-flushing mechanical filter system having a four-way tee socket section for alignment of inlet and outflow of water during sediment flushing (B).

FIG. 5 is a cross-sectional side view of another example side-flushing mechanical filter system 60 having a four-way tee socket 62 for alignment of inlet and outflow of water during sediment flushing (B). The components and operation of the system 60 may be substantially similar to the system 10 of FIGS. 1-4, except system 60 includes the four-way tee socket 62 instead of the three-way distal tee socket 26 and may include a straight segment (not shown) between the four-way tee socket 62 and the proximal cap 18 instead of the proximal tee socket 23. In this embodiment, second water inlet 64 of the four-way tee socket 62 replaces the second water inlet 30 of system 10, and second water outlet 66 of the four-way tee socket 62 replaces the second water outlet 24 of system 10. As shown, the second water inlet 64 and the second water outlet 66 are axially aligned along a longitudinal axis 68 of the four-way tee socket 62. The spring 52 and plates 46 extend through the four-way tee socket 62 as shown.

Figure 6:
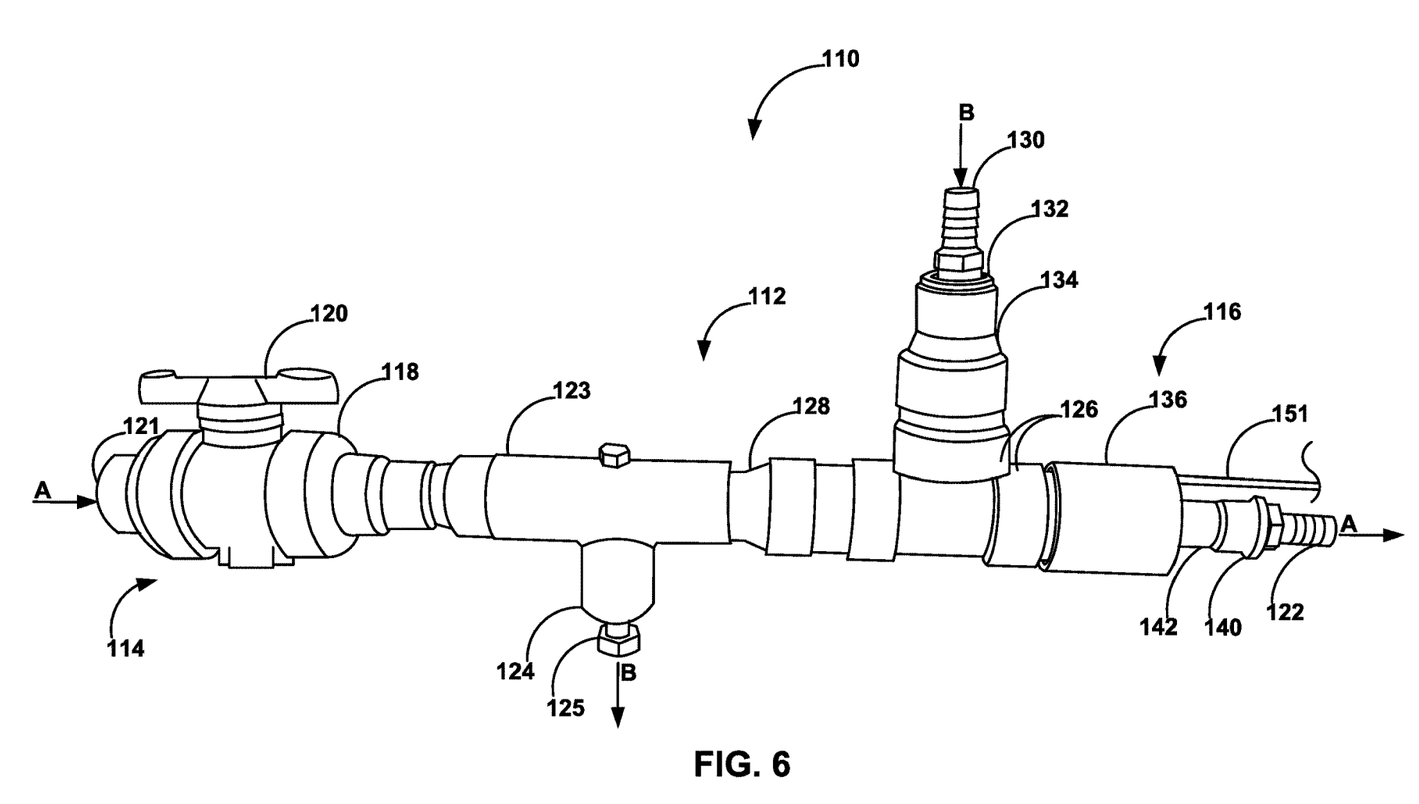
FIG. 6 is a side perspective view of a working prototype of another example of a side-flushing mechanical filter system in accordance with this disclosure, with paths of water travel during normal operation (A) and during sediment flushing (B) shown.

FIG. 6 is a side perspective view of a working prototype of another example of a side-flushing mechanical filter system 110 in accordance with this disclosure, with paths of water travel during normal operation (A) and during sediment flushing (B) shown. FIG. 6 shows all functional external features of the prototype system 110. Additional views of the prototype system 110 are presented in U.S. patent application Ser. No. 16/933,374, which is hereby incorporated herein by reference. The components and operation of the system 110 are substantially similar to the system 10 of FIGS. 1-4, with like reference numerals representing like features (e.g., the first valve 20 of system 10 corresponds to the first valve 120 of system 110, etc.). The prototype system 110 differs from the system 10 in that a bolt 125 is provided at the bottom of the pipe 112 instead of the valve 25 at the bottom of the pipe 12. During normal operation of the prototype system 110, the bolt 125 may be tightened to prevent the flow of water through the second water outlet 124, whereas during sediment-flushing operation, the bolt 125 may be loosened or removed to allow water to flow through the second water outlet 124. The prototype system 110 also differs from the system 10 in that a separate sediment outlet is not included. However, additional valves as illustrated and discussed with respect to FIG. 1 may be included in a similar prototype at one or more of the top, bottom, and/or distal regions of the prototype system 110 to control the flow of water through the system 110 during normal filtering operation and/or sediment flushing. Additionally, or alternatively, a sediment release valve may be included in a similar prototype, substantially as illustrated and discussed above.

The filter system of the present disclosure may be readily assembled from metalworking materials such as drills and saws, drilling a hole in a PVC pipe for the rod, placing the spring, plates, and rod mechanism within the pipe and attaching gaskets (i.e., rubber water seals, not shown) for the rod.

Figure 7:
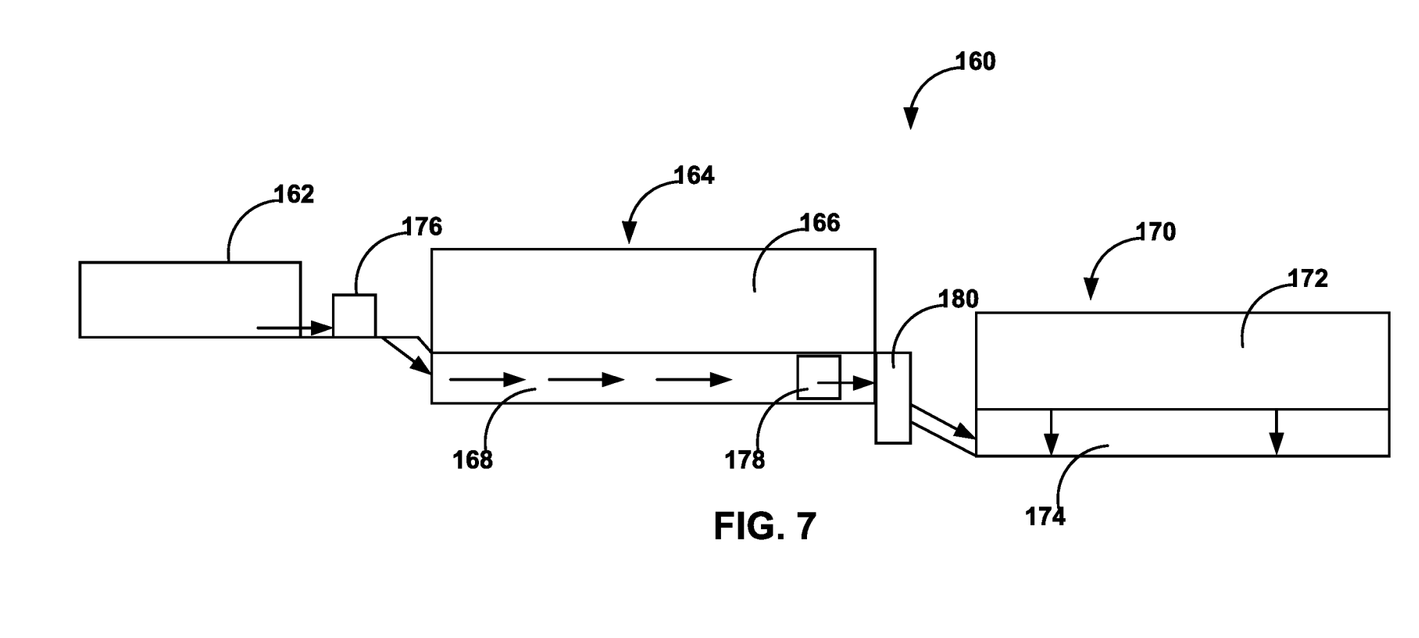
FIG. 7 is a block diagram of an example use of the side-flushing mechanical filter systems of this disclosure in a hybrid wetland system comprising a horizontal-flow wetland and a vertical-flow wetland.
Figure 8:
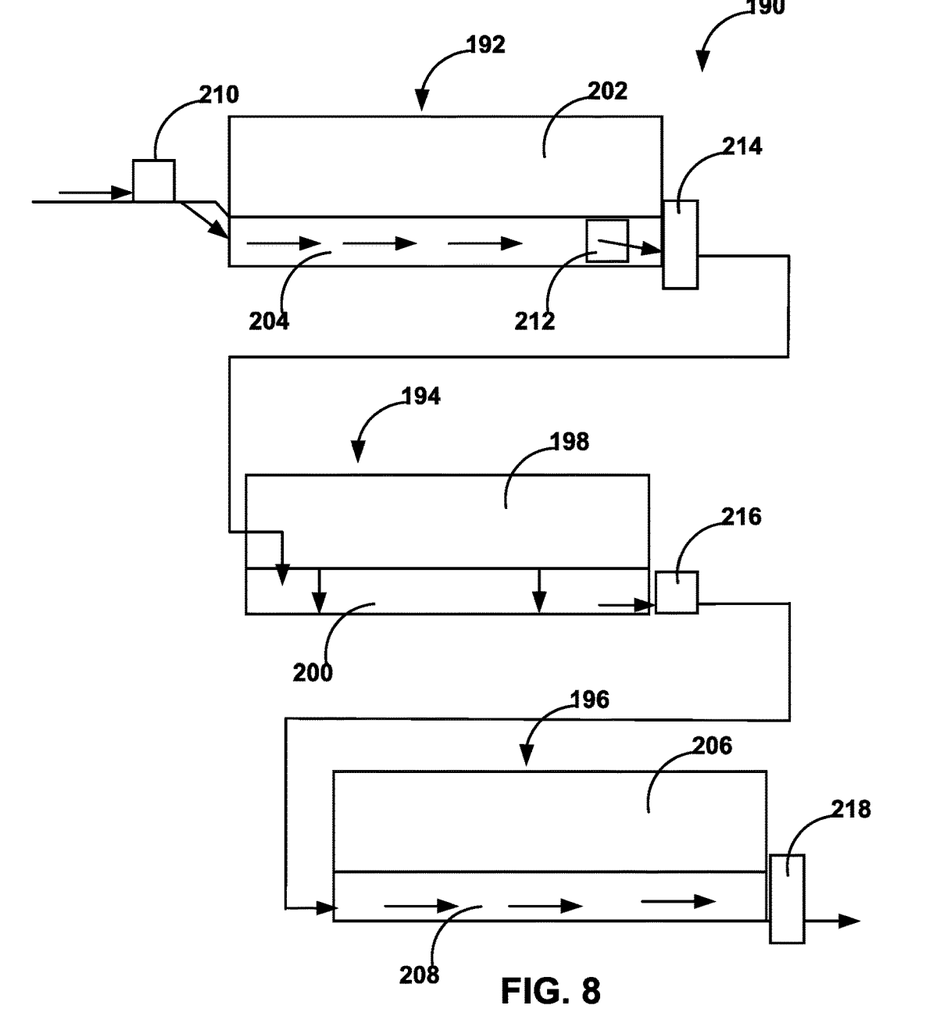
FIG. 8 is a block diagram of an example use of the side-flushing mechanical filter systems of this disclosure in a tiered wetland system comprising a vertical-flow wetland between two horizontal-flow wetlands.
Figure 9:
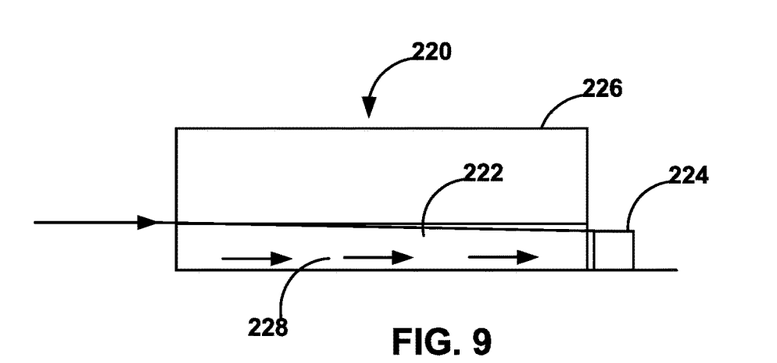
FIG. 9 is a block diagram of an example use of the side-flushing mechanical filter systems of this disclosure in a horizontal-flow wetland with a hose attached to the filter system during sediment flushing.

FIGS. 7-9 illustrate several uses of the side-flushing mechanical filter systems of the present disclosure in various types of wetlands. In all such uses, the filter systems of the present disclosure advantageously are easy to clean in wetland applications, thereby providing lower risk of sediment buildup, running longer and functioning better at wetland maturity than other known filter systems.

FIG. 7 is a block diagram of an example use of the side-flushing mechanical filter systems of this disclosure in a hybrid wetland system 160 comprising a settling basin 162, a horizontal-flow wetland 164 comprising an above-water-filled area 166 and water-filled area 168, and a vertical-flow wetland 170 comprising an above-water-filled area 172 and a water-filled area 174. The path of travel of water throughout the wetland system 160 is depicted by the arrows, from the settling basin 162 to the vertical flow-wetland 170. Wetlands 164 and 170 may contain crops or other plants growing therein. In some instances, wetlands 164 and/or 170 may be constructed wetlands built using a combination of materials such as piping, basins made from landscape fabric and other sealing tarps, wood, concrete, native plants (cattails are specifically helpful), rigid plastic basins, solar pumps and/or a hydraulic ram.

Multiple filter systems according to the present disclosure may be placed in the wetland system 160 to optimize sediment filtering. For example, a first filter system 176 (which may be a filter system according to FIG. 1-5 or 6) may be positioned between the settling basin 162 and the horizontal-flow wetland 164, with the proximal end of the filter system 176 connected to the settling basin 162 with a hose or pipe and the distal end of the filter system 176 connected to the horizontal-flow wetland 164 with a hose or pipe so that filtered water flows into the wetland 164. A second filter system 178, which may be substantially similar to the filter system 176, is positioned in water-filled area 168 of the horizontal-flow wetland 164 so that water flows into the proximal end and out of the distal end of the filter system 178. Filtered water flows into a water control chamber 180 and then into the vertical-flow wetland 170. Sediment accumulating in the filter systems 176 and 178 may be flushed as discussed above.

FIG. 8 is a block diagram of an example use of the side-flushing mechanical filter systems of this disclosure in a tiered wetland system 190. The tiered wetland system 190 comprises a vertical-flow wetland 194 between two horizontal-flow wetlands 192 and 196. The vertical-flow wetland 194 may be similar to the vertical-flow wetland 170 of FIG. 7, comprising an above-water-filled area 198 and a water-filled area 200, while the horizontal-flow wetlands 192 (comprising an above-water-filled area 202 and a water-filled area 204) and 196 (comprising an above-water-filled area 206 and a water-filled area 208) may be similar to wetland 164 of FIG. 7. As in FIG. 7, a first filter system 210 of the present disclosure may be positioned as discussed above to filter water entering wetland 192 and a second filter system 212 may be positioned in water-filled area 204 of the horizontal-flow wetland 192 so that water flows into the proximal end and out of the distal end of the filter system 212. Filtered water flows into a water control chamber 214 and then into the vertical-flow wetland 194. A third filter system 216 may be positioned between vertical-flow wetland 194 and the second horizontal-flow wetland 196 to filter water exiting the vertical-flow wetland 194 before it enters the second horizontal-flow wetland 196. A second water control chamber 218 may be positioned to control water exiting the second horizontal-flow wetland 196. In this manner, the water flowing through the wetland system 190 is filtered before entering each of wetlands 192, 194, and 196. Sediment accumulating in the filter systems 210, 212, and 216 may be flushed as discussed above.

FIG. 9 is a block diagram of an example use of the side-flushing mechanical filter systems of this disclosure in a horizontal-flow wetland 220 with a hose 222 attached to a filter system 224 during sediment flushing. Horizontal-flow wetland 220 may be similar to the horizontal-flow wetlands described above, comprising an above-water-filled area 226 and a water-filled area 228. The filter system 224 may be substantially similar to the filter systems of FIG. 1-5 or 6. Water flowing into the horizontal-flow wetland 220 enters the hose 222, which is connected to an upper water inlet (e.g., second water inlet 30 of filter system 10 or second water inlet 130 of filter system 110), spraying water onto the plates within the filter system 224 to enable sediment flushing from the filter system 224 as described above with respect to filter systems 10 and 110.

Figure 10:
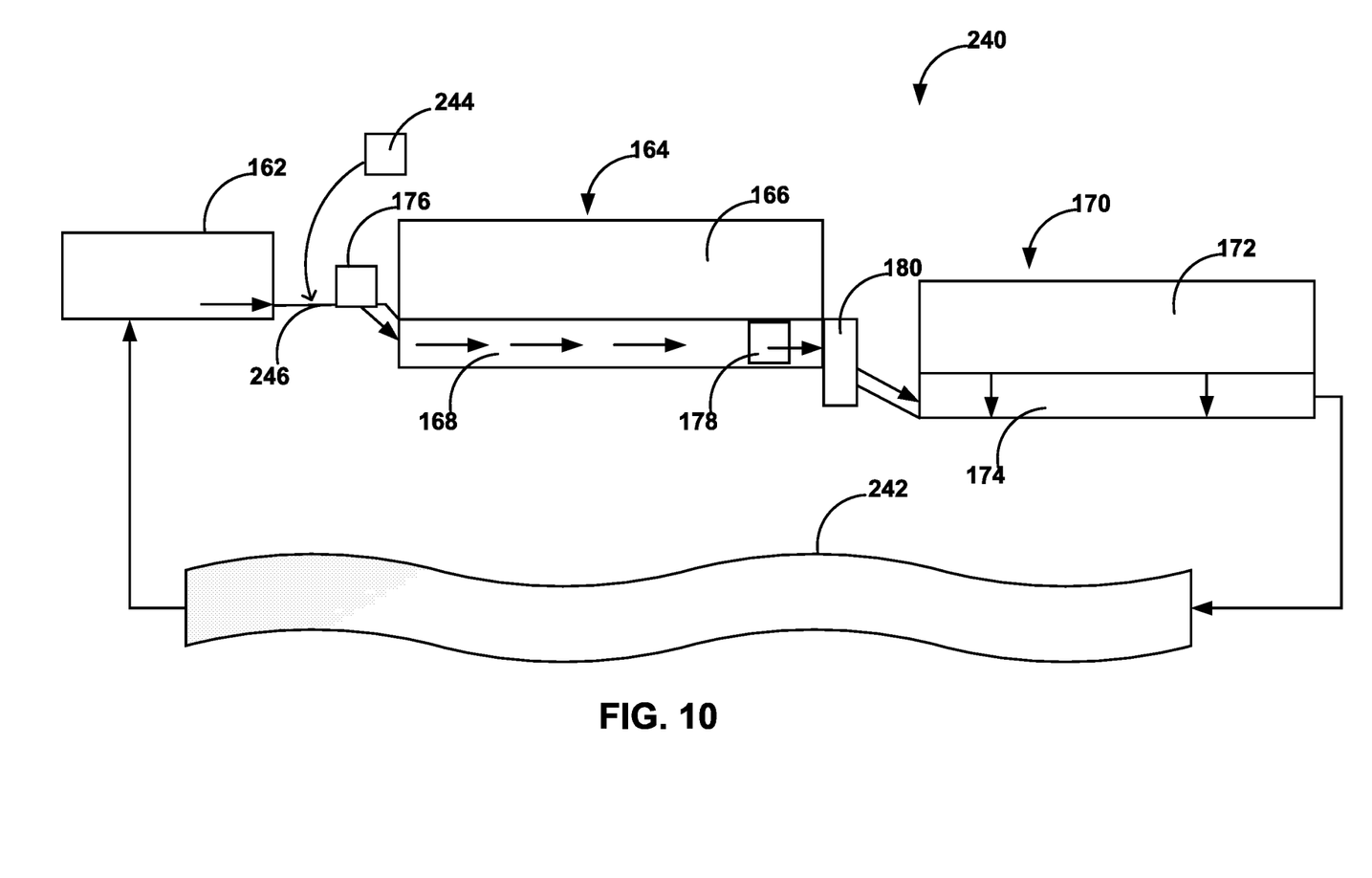
FIG. 10 illustrates a system for filtering water from a drainage ditch or stream, using the hybrid wetland system and filters of FIG. 7, and returning the filtered water to a drainage ditch or stream after it exits the wetland.

FIG. 10 illustrates a system 240 for filtering water from a body of water 242, which may be a drainage ditch or stream, using the hybrid wetland system 160 and filter systems 176 and 178 of FIG. 7, and returning the filtered water to the drainage ditch or stream 242 after it exits the wetland 170. It should be understood that the system 240 of FIG. 10 may be adapted for use with the tiered wetland system 190 of FIG. 8. In the system 240 of FIG. 10, the wetlands 164 and/or 170 may be constructed wetlands built using made from a combination of materials such as piping, basins made from landscape fabric and other sealing tarps, wood, concrete, native plants (cattails are specifically helpful), rigid plastic basins, solar pumps and/or a hydraulic ram.

In the system 240 of FIG. 10, the hybrid wetland system 160 operates using a combination of subsurface flow wetlands and free flow surface wetland to reduce nutrient pollution through nitrification and denitrification. As described below, the system 240 of FIG. 10 uses the constructed hybrid wetland system 160 to optimize bacteria present in the wetland system for carbon capture, nitrous-oxide emission abatement, and nutrient pollution removal, such as removal of surface water nitrates from the water from the drainage ditch or stream 242. In this manner, the system 240 of FIG. 10 reduces greenhouse gas emissions by reducing or eliminating downstream eutrophication that is caused by surface water nitrates, and by sequestering carbon. It is desirable to reduce or eliminate this eutrophication for several reasons, including reducing or eliminating the greenhouse gas emissions produced by eutrophication, and reducing or eliminating other environmental problems caused by eutrophication.

As shown in FIG. 10, water is pumped from the drainage ditch or stream 242 to the settling basin 162. After larger sediment is allowed to settle, the water is pumped from the settling basin 162 into a pipe 246 to the filter system 176. Biochar, or another organic carbon source, is introduced to the pipe 246 from a biochar source 244 (e.g., container) by any suitable means. By piping biochar or other organic carbon sources into the system 160, the available organic carbon levels in the system 160 can be increased or decreased to increase or decrease the amount of bacteria reliant on organic carbon present in the water. The biochar or other organic carbon source is diluted in water through each stage of the system 160. The biochar or other organic carbon sources are filtered through sediment filter(s), preferably the filter systems 176 and 178, to prevent clogging between stages of the wetland system and to conserve the captured sediments.

In the system 240 of FIG. 10, the wetland system 160 can also be adapted to use a geothermal source for the purpose of increasing the autotrophic bacteria within the wetland that produce nitrogen as a byproduct rather than nitrous oxide. Autotrophic bacteria may still rely on an electron donor that can be provided by adding well-known donors for these bacteria as needed.

It should be understood that FIGS. 1, 5, and 6 show more generally assemblies comprising an elongated filter body (comprising, for example, pipe 12, 112; proximal cap 18, 118; proximal tee socket 23, 123; connector 28, 128; distal tee socket 26, 126 and/or four-way tee socket 62; and/or distal cap 36, 136) extending from a first end 14, 114 to an opposite second end 16, 116. An inlet 21, 121 is located at the first end 14, 114 of the filter body. An elongated spring 52 is positioned within an interior of the filter body, the elongated spring 52 comprising a plurality of coils 54 and extending substantially parallel to a longitudinal axis 50 extending from the first to second end of the filter body. A plurality of plates 46 is positioned within the filter body, wherein each plate 46 is attached to a different one of the plurality of coils 54 of the spring 52 such that a major face of each plate 46 is substantially perpendicular to the longitudinal axis 50 of the filter body. Each plate 46 of the plurality of plates defines at least one hole 48 therethrough. A rod 51, 151 is positioned partially within the filter body such that a first end of the rod 51, 151 is coupled to at least one of the spring 52 and a plate 46 of the plurality of plates, and a second portion of the rod 51, 151 extends externally of the filter body from the second end 16, 116 of the filter body. The major face of each plate 46 is configured to arrest sediment from water flowing into the filter body via the inlet 21, 121 while the holes 48 defined by the plates 46 enable water to flow therethrough toward the second end 16, 116 of the filter body.

Figure 11:
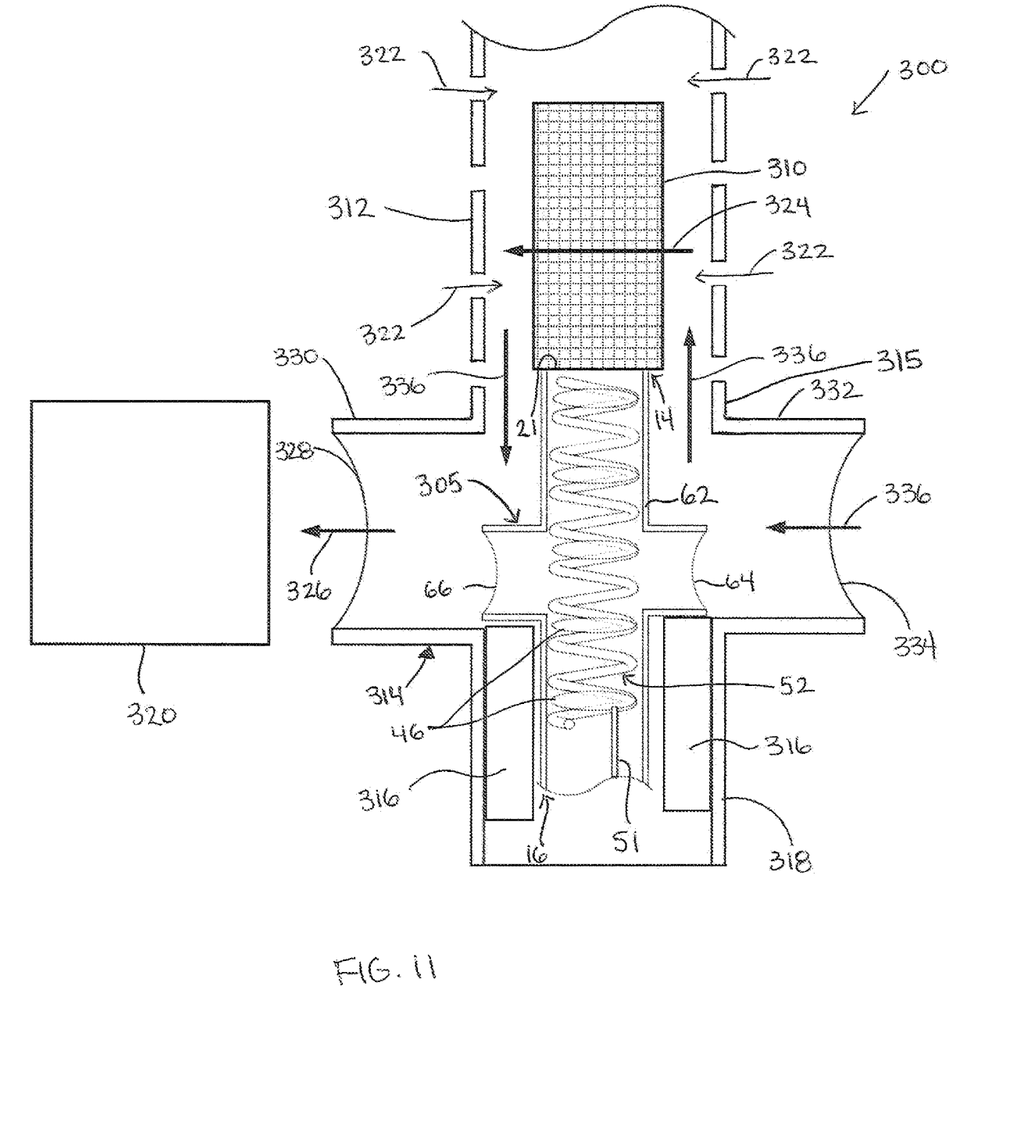
FIG. 11 is an example of a carbon injector assembly according to the present disclosure.

FIG. 11 shows how an assembly according to FIG. 1, 5, or 6 could be used in an assembly 300 including a carbon injector, which may be used to maintain the ratio of carbon/nitrogen that is needed to facilitate complete denitrification within a wetland, bioreactor, or the like. Note that the assembly shown in FIG. 11 includes a filter body 305 that most closely resembles the embodiment described herein above with respect to FIG. 5, in which the water inlet 64 and water outlet 66 are axially aligned along the filter body 305 by way of provision of four-way tee socket 62. The assembly 300 further comprises a perforated pipe 310 coupled to the first end 14 of the filter body 305. The perforated pipe 310 may cylindrical and may be made of a wire mesh or screen or of a plastic such as PVC through which holes have been drilled. The perforated pipe 310 may be coupled to the first end 14 of the filter body 305 by way of a connector such as a sleeve, or by way of a threaded feature provided on the adjacent ends of each component, although other separable connections may be used. An interior of the perforated pipe 310 is configured for fluid communication with the interior of the filter body 305 via the inlet 21 at the first end 14 of the filter body 305. The perforated pipe 310 is configured to hold an organic carbon source and to allow water to flow through the perforations in the perforated pipe 310 and through the organic carbon source, as will be described further herein below.

The assembly 300 further includes a slotted well screen 312, which is coupled to a four-way tee socket 314. For example, the slotted well screen 312 is glued, threaded onto, or otherwise attached to the upper arm 315 of the four-way tee socket 314. Slotted well screens are well known in the art, and the particular slotted well screen used herein is not key to the scope of the present disclosure. The slotted well screen 312 is, however, large enough to receive the filter body 305 and the perforated pipe 310 therein. The filter body 305 rests on mounts 316 provided within the lower arm 318 of the four-way tee socket 314, which mounts 316 may be flanges glued or otherwise coupled within the lower arm 318 or which may be formed by a rubber gasket having an outer diameter that fits snugly within the inner diameter of the lower arm 318 of the four-way tee socket 314 and an inner diameter small enough to support the two side arms of the four-way tee socket 62 of the filter body 305. By selecting an appropriate diameter of the slotted well screen 312 and perforated pipe 310 as well as an appropriate dimension of the four-way tee socket 62 of the filter body 305, the perforated pipe 310 and filter body 305 are removable from the slotted well screen 312. Once removed, the organic carbon source can be removed from the perforated pipe 310, and any sediment can be removed from the filter body 305 by way of back-and-forth longitudinal movement of the rod 51 to move the spring 52 and dislodge sediment from the plates 46 and an inner surface of the filter body 305. The perforated pipe 310 may be removable from the first end 14 of the filter body 305 in order to facilitate removal of the carbon source.

The filter body 305 comprises a water inlet 64 and a water outlet 66 between the first and second ends 14, 16 of the filter body 305. When the filter body 305 and perforated pipe 310 are installed in the slotted well screen 312 and the four-way tee socket 314, the water inlet 64 and water outlet 66 are closed by valves (not shown, but see 45, 25, FIG. 1). The lower second end 16 of the filter body 305 is provided with an end cap through which the rod 51 extends in a fluid-tight manner, as described herein above. However, once the filter body 305 has been removed from the slotted well screen 312, both valves can be opened, and a water source can be provided at water inlet 64 to provide water that flows into the filter body 305 via the water inlet 64 and over the plates 46 to dislodge sediment from the plates 46 and the inner surface of the filter body 305, and then out of the water outlet 66. The rod 51 can be moved in the back-and-forth direction at the same time to aid in the cleaning process. Once the filter body 305 has been thus cleaned of sediment, the valves can be closed and the perforated pipe 310 reconnected to the first end 14 of the filter body 305. A fresh organic carbon source is then added to the perforated pipe 310, and the perforated pipe 310 and filter body 305 are then reinstalled in the slotted well screen 312.

The assembly of FIG. 11 can be used in a system for removing pollutants from water, which may include a hybrid wetland system comprising a wetland pipe 320 positioned to transport water into, within, or out of the hybrid wetland system. For instance, the wetland pipe 320 may be any of the pipes noted herein above with respect to FIGS. 7-10. However, the assembly of FIG. 11 has particularly advantageous effects when positioned in fluid communication with a wetland pipe 320 that is within a wetland, such as within water-filled area 168 of horizontal flow wetland 164 shown in FIG. 10. (Note that the carbon injector assembly 300 would supplement, not replace, the filter system 178 already provided in that wetland 164.) The assembly 300 is coupled to the wetland pipe 320 in an orientation in which water is configured to flow through the slotted well screen 312 as shown by the arrows 322, subsequently through the perforated pipe 310 and organic carbon source therein as shown by the arrow 324, and subsequently into the wetland pipe 320, as shown by the arrow 326. (Note that the four-way tee socket 314 would have its outlet 328 at the end of left-hand arm 330 connected to an inlet end of the wetland pipe 320, such as directly or by way of a connector piece.) Water flows radially inwardly through the slotted well screen 312 as shown by arrows 322 due to the head at this location, as the slotted well screen 312 is to be positioned at the bottom of a wetland. Of course, water may also flow through the perforated pipe 310 in a direction opposite that of arrow 324, but a majority of the flow will be in the direction of arrow 324 if the system is designed such that the head at the assembly 300 is higher than the head at the outlet end of the wetland pipe 320.

In one example, the right-hand arm 332 of the four-way tee socket 314 is provided with a valve or end cap. In another example, the right-hand arm 332 is left open such that water can flow into its inlet 334 from another pipe, such as a pipe carrying water from elsewhere in the wetland or from outside the wetland. This water flows through the system as shown by arrows 336 and 324, again noting that the head at the inlet 334 and in the wetland above the slotted well screen 312 is greater than the head at the outlet end of the wetland pipe 320. This may be advantageous when the assembly 300 is installed in a wetland or bioreactor system that has already been in use. For example, all subsurface pipes in the wetland can be found using a drainage tile probe, and then holes can be drilled in these existing pipes to accommodate the slotted well screen and carbon injector assembly 300. The slotted well screen 312 can be anchored to the bottom of the bioreactor/wetland at least six inches from any liner used in construction in order to ensure structural integrity. The top of the slotted well screen 312 can be capped with a rubber stopper to prevent leakage of the carbon from the assembly 300.

As noted, the assembly 300 acts as a carbon injector, which has advantages over a standard static carbon source that is added to the entire bioreactor or wetland upon initial construction. The use of a carbon injector, which is easily removable once the carbon source is no longer as efficacious and replaceable with a source of fresh carbon helps to maintain the ratio of carbon/nitrogen that is needed to facilitate complete denitrification within the wetland/bioreactor system. The carbon injector assembly 300 serves as a micro-biome inside of the larger wetland/bioreactor system, and the carbon therein decreases the creation of harmful toxins such as methane and nitrous oxide. The carbon injector assembly 300 also decreases nitrate and phosphate, which need a carbon source in order to convert back to nitrogen and phosphorus.

Unactivated carbon inside the perforated pipe 310 of the carbon injector assembly 300 is turned into activated carbon by nitrate and phosphorus uptake. To remove the activated carbon from the injector, the perforated pipe 310 and filter body 305 are pulled from the slotted well screen 312, for example by way of a handle (not shown), and water within the perforated pipe 310 is allowed to escape. Water still within the filter body 305 is not allowed to escape as it still holds large amounts of nitrogen and phosphorus. The perforated pipe 310 and filter body 305 are then rotated horizontally to prepare to plunge the carbon. The carbon is then plunged from the perforated pipe 310 by movement of the spring 52 and plates 46 as the rod 51 is moved back-and-forth longitudinally as described herein above. The activated carbon thus removed from the perforated pipe 310 may be captured in a microfiber sediment basin, after which it can be used as a fertilizer supplement or directly applied as a soil amendment. The perforated pipe 310 and filter body 305 can then be disassembled from one another for further cleaning, such as rinsing of sediment from the filter body 305 as described herein above.

The description of the invention and its applications as set forth herein is illustrative and is not intended to limit the scope of the invention. Features of various embodiments may be combined with other embodiments within the contemplation of this invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

What is claimed is:

1. A mechanical filter system comprising:
    a main body comprising an elongated section of pipe extending from a proximal end to a distal end;
    a first water inlet at the proximal end of the pipe;
    a first water outlet at the distal end of the pipe;
    an elongated spring positioned within the pipe, the elongated spring comprising a plurality of coils and extending substantially parallel to a longitudinal axis defined by the pipe;
    a plurality of plates positioned within the pipe, wherein each plate is attached to a different one of the plurality of coils of the spring such that a major face of each plate is substantially perpendicular to the longitudinal axis of the pipe, each plate of the plurality of plates defining at least one hole therethrough; and
    a rod positioned partially within the pipe such that a proximal end of the rod is coupled to at least one of the spring and a plate of the plurality of plates, and a distal portion of the rod extends externally of the pipe from the distal end of the pipe,
    wherein the major face of each plate is configured to arrest sediment from water flowing into the pipe via the first water inlet while the holes defined by the plates enable filtered water to flow therethrough and out of the first water outlet when the first water inlet and the first water outlet are opened.

2. The mechanical filter system of claim 1, further comprising a sediment outlet positioned at a lower surface of the pipe between the proximal and distal ends of the pipe;
    wherein the rod is configured for back-and-forth longitudinal movement during cleaning of accumulated sediment from the system to dislodge sediment from the plates and a bottom inner surface of the pipe such that the longitudinal movement of the rod pushes the dislodged sediment toward the sediment outlet.

3. The mechanical filter system of claim 2, further comprising:
    a first valve positioned at the first water inlet;
    a second valve positioned at the sediment outlet;
    wherein the first valve is configured to be open and the second valve is configured to be closed when the system is filtering sediment from water; and
    wherein the first valve is configured to be closed and the second valve is configured to be open during cleaning of accumulated sediment from the system.

4. The mechanical filter system of claim 3, further comprising a third valve positioned at the first water outlet;
    wherein the third valve is configured to be open when the system is filtering sediment from water; and wherein the third valve is configured to be closed during cleaning of accumulated sediment from the system.

5. The mechanical filter system of claim 1, further comprising:
a second water inlet positioned at an upper surface of the pipe between the proximal and distal ends of the pipe; and
a second water outlet positioned at a lower surface of the pipe between the proximal and distal ends of the pipe;
wherein graywater flows into the pipe via the second water inlet and over the plurality of plates to dislodge sediment from the plurality of plates and a bottom inner surface of the pipe and subsequently the graywater flows out of the second water outlet.

6. The mechanical filter system of claim 5, wherein the second water inlet and the second water outlet are axially aligned along the longitudinal axis of the pipe.

7. The mechanical filter system of claim 5, wherein the second water inlet is positioned distally to the second water outlet along the longitudinal axis of the pipe.

8. The mechanical filter system of claim 1, wherein each plate in the plurality of plates is attached to a different coil of the spring such that there is at least one non-plate-bearing coil between each of the plate-bearing coils of the spring.

9. An assembly comprising:
the mechanical filter system of claim 1; and
a perforated pipe coupled to the proximal end of the pipe of the mechanical filter system, an interior of the perforated pipe configured for fluid communication with an interior of the pipe of the mechanical filter system via the proximal end thereof;
wherein the perforated pipe is configured to hold an organic carbon source and to allow water to flow through the perforations in the perforated pipe and through the organic carbon source.

10. The assembly of claim 9, further comprising a slotted well screen, wherein the slotted well screen is configured to receive the mechanical filter system and the perforated pipe therein.

11. The assembly of claim 10, wherein the perforated pipe and the mechanical filter system are removable from the slotted well screen such that the organic carbon source can be removed from the perforated pipe, and any sediment can be removed from the pipe of the mechanical filter system by way of back-and-forth longitudinal movement of the rod to dislodge sediment from the plurality of plates and an inner surface of the pipe.

12. A method of using the mechanical filter system of claim 1, the method comprising:
pumping water to be filtered from a body of water to a settling tank;
allowing large sediment from the water pumped from the body of water to settle in the settling tank;
pumping the water from the settling tank into a pipe connecting the settling tank to the mechanical filter system;
adding biochar or another organic carbon source to the water via the pipe connecting the settling tank to the mechanical filter system;
allowing the water to pass through the mechanical filter system and a hybrid wetland system, thereby removing pollutants from the water; and
returning the filtered water to the body of water.

13. A system for removing pollutants from water, the system comprising:
at least one of the mechanical filter system of claim 1; and
a hybrid wetland system, comprising:
a settling tank;
a first pipe positioned to transport water to be filtered from a body of water to the settling tank;
a first constructed wetland connected to the settling tank via a second pipe, wherein a first one of the at least one of the mechanical filter system is positioned to remove pollutants from water passing through the second pipe before entering the first constructed wetland, and wherein a second one of the at least one of the mechanical filter system is positioned within the first constructed wetland along a path of water flow therethrough to further remove pollutants from the water;
a second constructed wetland connected to the first constructed wetland via a third pipe and a water control chamber such that filtered water exiting the first constructed wetland flows through the water control chamber, through the third pipe, and into the second constructed wetland; and
a fourth pipe extending between the second constructed wetland and the body of water, positioned to return filtered water to the body of water from the second constructed wetland.

14. The system of claim 13, wherein the second pipe defines an inlet configured to receive biochar or another organic carbon source such that the biochar or other organic carbon source mixes with the water passing through the second pipe from the settling tank to the first one of the at least one of the mechanical filter system, and wherein the biochar or other organic carbon source added to the water is configured to modulate the quantity of bacteria reliant on organic carbon in the water.

15. An assembly comprising:
an elongated filter body extending from a first end to an opposite second end;
an inlet at the first end of the filter body;
an elongated spring positioned within an interior of the filter body, the elongated spring comprising a plurality of coils and extending substantially parallel to a longitudinal axis extending from the first to second end of the filter body;
a plurality of plates positioned within the filter body, wherein each plate is attached to a different one of the plurality of coils of the spring such that a major face of each plate is substantially perpendicular to the longitudinal axis of the filter body, each plate of the plurality of plates defining at least one hole therethrough; and
a rod positioned partially within the filter body such that a first end of the rod is coupled to at least one of the spring and a plate of the plurality of plates, and a second portion of the rod extends externally of the filter body from the second end of the filter body;
wherein the major face of each plate is configured to arrest sediment from water flowing into the filter body via the inlet while the holes defined by the plates enable water to flow therethrough toward the second end of the filter body.

16. The assembly of claim 15, further comprising a perforated pipe coupled to the first end of the filter body, an interior of the perforated pipe configured for fluid communication with the interior of the filter body via the inlet at the first end of the filter body;

wherein the perforated pipe is configured to hold an organic carbon source and to allow water to flow through the perforations in the perforated pipe and through the organic carbon source.

17. The assembly of claim 16, further comprising a slotted well screen, wherein the slotted well screen is configured to receive the filter body and the perforated pipe therein.

18. The assembly of claim 17, wherein the perforated pipe and filter body are removable from the slotted well screen such that the organic carbon source can be removed from the perforated pipe, and any sediment can be removed from the filter body by way of back-and-forth longitudinal movement of the rod to dislodge sediment from the plurality of plates and an inner surface of the filter body.

19. The assembly of claim 18, wherein the filter body comprises a water inlet and a water outlet between the first and second ends of the filter body, and wherein water is configured to flow into the filter body via the water inlet and over the plurality of plates to dislodge sediment from the plurality of plates and the inner surface of the filter body, and then out of the water outlet.

20. A system for removing pollutants from water, the system comprising:
   a hybrid wetland system comprising a wetland pipe positioned to transport water into, within, or out of the hybrid wetland system; and
   the assembly of claim 18, wherein the assembly is coupled to the wetland pipe in an orientation in which water is configured to flow through the slotted well screen, subsequently through the perforated pipe and organic carbon source, and subsequently into the wetland pipe.

* * * * *